Dec. 14, 1937.  F. KLUTKE  2,102,419
OSCILLATION GENERATOR
Filed Feb. 12, 1936
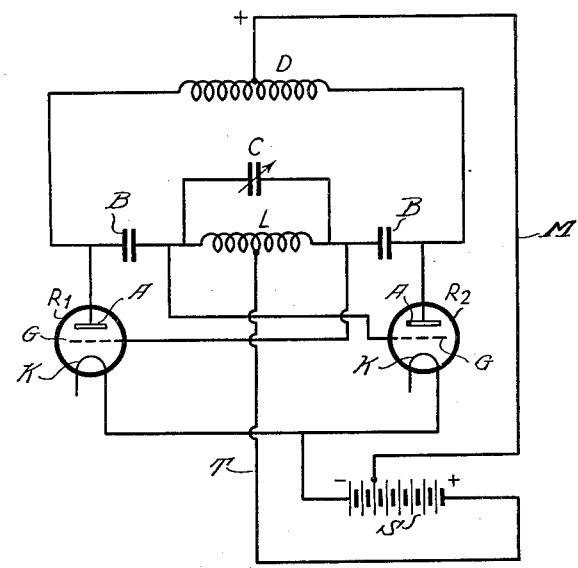
INVENTOR.
FRITZ KLUTKE
BY
ATTORNEY.

Patented Dec. 14, 1937

2,102,419

UNITED STATES PATENT OFFICE 2,102,419

OSCILLATION GENERATOR

Fritz Klutke, Berlin-Johannisthal, Germany, assignor to Allegemeine Elektricitatz Gesellschaft, Berlin, Germany, a corporation of Germany Application February 12, 1936, Serial No. 63,486
In Germany April 6, 1935

5 Claims. (Cl. 250—36)

In measuring work an oscillator should be available which will furnish an exactly defined and fixed output potential, regardless of whatever frequency may be worked with. For this purpose, the suggestion has been made, for instance, to provide an oscillator tube or valve with an amplifier whose gain or amplification factor is regulated as a function of the input potential in such a way that the output potential will always be constant and unvaried.

The object of this invention is a generator in which, without additional auxiliary means, the desired output voltage which is obtained will be independent of the frequency. For this object, a regenerative valve oscillator, preferably in push-pull connection, is operated on a positive grid potential which is of the same size as, or higher than, the plate voltage. The losses introduced in the circuit of the invention vary with tuning in an inverse manner to the variation of the oscillatory voltage developed in an oscillator operating with negative bias, thus reducing variation of oscillatory voltage with frequency. In the light of actual experiments it is possible with the aid of such a generator to insure an output voltage which, within wide limits will be independent of the frequency.

One exemplified embodiment of such a generator or oscillator is shown in the annexed drawing. The two tubes $R_1$ and $R_2$, each having an anode A, a cathode K, and a grid G, are connected to work push-pull fashion, as known in the art. The frequency of the generator is governed by the oscillatory circuit comprising the inductance L and the capacity C. By varying the capacity C, the frequency may be altered, as known in the art. At the grids G of both tubes prevails a positive potential relative to the anodes A which is impressed thereon by way of a source of unidirectional potential S, lead T, and the center tap of the coil L forming part of the oscillatory circuit. The plate or anode voltage is applied by way of lead M connected to an intermediate terminal on source S and a center tap of a series choke coil D. The anodes A of the tubes $R_1$ and $R_2$ are each coupled to the terminals of coil L through a blocking condenser B. The grid potentials, as above pointed out, is equal to, or higher than, the plate or anode voltage with respect to the cathode.

It goes without saying that the invention is not restricted to the exemplified embodiment thereof hereinbefore described by reference to the drawing, in fact, it may be used successfully also in connection with other known generator or oscillator circuit organizations, it being immaterial in this connection whether the tubes are heated directly or indirectly, or whether a single tube is used. It is feasible also to employ tubes of the multi-grid type.

A generator according to the invention offers this additional merit that it is capable of modulation in any desired manner.

What is claimed is:

1. A regenerative oscillator comprising an electron discharge device having within an envelope, an anode, a cathode and a grid, a feed-back circuit between said anode and grid, and means for maintaining said anode at a positive direct current potential relative to said cathode and said grid at a direct current potential at least as positive as said anode with respect to said cathode, whereby there is obtained substantial constancy of amplitude of oscillation.

2. A regenerative oscillation generator comprising an electron discharge device having within an envelope, an anode, cathode and grid, an oscillatory circuit between said anode and grid, and means for maintaining said anode at a positive direct current potential and said grid at a sufficiently positive direct current potential, at least as positive as said anode with respect to said cathode, to introduce losses varying with adjustment of tuning in an inverse manner to the variation of oscillatory voltage developed in an oscillator operating with negative grid bias, whereby the variation of oscillatory voltage with frequency is substantially reduced.

3. A regenerative oscillation generation system comprising two electron discharge devices connected in push-pull relation, each of said devices having an anode, cathode and grid, a tuned circuit consisting of an inductance in parallel with a condenser connected between said anodes, a connection from each grid to the terminal of said tuned circuit which is opposite that terminal connected to the anode of the same device, a connection between said cathodes, and means for maintaining said anodes at a positive direct current potential with respect to said cathodes and said grids also at a positive direct current potential relative to said cathodes which is at least equal to that of said anodes.

4. A regenerative oscillation generation system comprising two electron discharge devices connected in push-pull relation, each of said devices having an anode, cathode and grid, a tuned circuit consisting of an inductance in parallel with a condenser connected between said anodes, a connection from each grid to the terminal of said tuned circuit which is opposite that terminal connected to the anode of the same device, a connection between said cathodes, and means for maintaining said anodes at a positive direct current potential with respect to said cathodes and said grids also at a positive direct current potential relative to said cathodes which is greater than that of said anodes.

5. A regenerative oscillator comprising an electron discharge device triode having within an envelope an anode, a cathode and a grid, a path between said anode and grid for feeding back oscillatory energy from said anode, and means for maintaining said anode at a positive direct current potential relative to said cathode and said grid at a positive direct current potential greater than that of said anode with respect to said cathode, whereby there is obtained substantion constancy of amplitude of oscillation.

FRITZ KLUTKE.